No. 769,654. PATENTED SEPT. 6, 1904.
W. S. KEMPER.
PIPE UNION.
APPLICATION FILED APR. 5, 1904.
NO MODEL.

Witnesses:
K. H. Butler
E. E. Potter

Inventor
W. S. Kemper,
By N. C. Evert & Co.
Attorneys

No. 769,654.

Patented September 6, 1904.

UNITED STATES PATENT OFFICE.

WILLIAM S. KEMPER, OF McKEESPORT, PENNSYLVANIA.

PIPE-UNION.

SPECIFICATION forming part of Letters Patent No. 769,654, dated September 6, 1904.

Application filed April 5, 1904. Serial No. 201,702. (No model.)

*To all whom it may concern:*

Be it known that I, WILLIAM S. KEMPER, a citizen of the United States of America, residing at McKeesport, in the county of Allegheny and State of Pennsylvania, have invented certain new and useful Improvements in Pipe-Unions, of which the following is a specification, reference being had therein to the accompanying drawings.

This invention has relation to pipe-unions, and relates in particular to unions for soft-metal pipe, and has for its object the provision of novel means for detachably securing together the adjacent ends of soft-metal pipes.

The invention consists in the novel construction, combination, and arrangement of parts hereinafter described and claimed.

Figure 1:
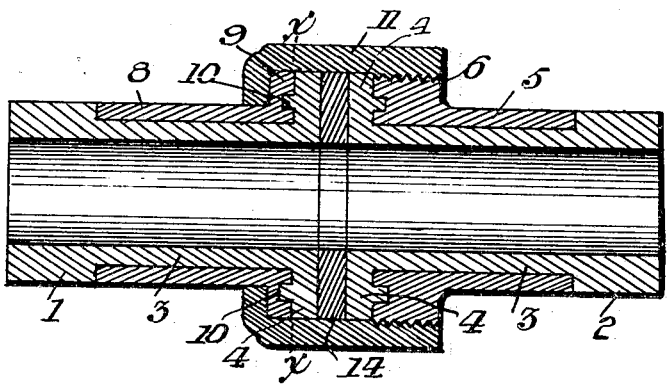
Figure 2:
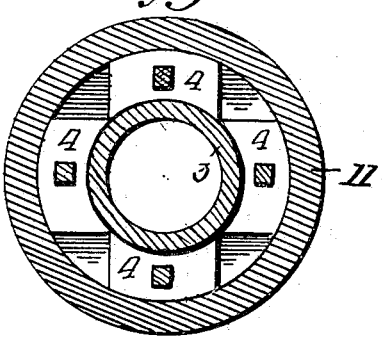
Figure 3:
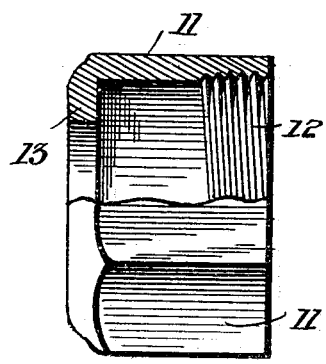
Figure 4:
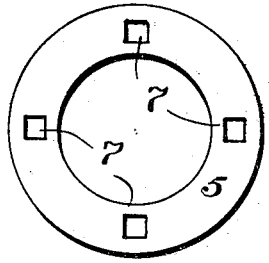

In the accompanying drawings, Figure 1 is a longitudinal sectional view of a pipe-union constructed according to my invention. Fig. 2 is a transverse sectional view of the same on the line $x$ $x$ of Fig. 1. Fig. 3 is a detached view, partly in section, of one of the union members; and Fig. 4 is an end view of another one of the union members.

The two sections of pipe 1 and 2, which are joined together by my improved union, are of soft metal—for instance, lead—and each section is of the same configuration, both being formed with reduced end portions 3 and upset radial wings 4. A union member 5, which is screw-threaded exteriorly at 6, is fitted upon the reduced portion 3 of the pipe-section 2, and the wings 4 are hammered up after the member 5 has been placed in position, thus permanently securing the union member on the pipe-section 2. The union member 5 has cavities 7 formed in its face, and when the wings 4 of the pipe-section are upset or formed from the end of the union member 5 by hammering or upsetting said extending end a part of the metal of the wings is forced into these cavities 7, thus providing a means for securing the pipe-section against rotary movement in the union member. The pipe-section 1 carries a union member 8, which is formed with an annular flange 9, the said flange having cavities 10 on its face similar to the cavities 7 of the union member 5, and the pipe-section 1 has the wings 4 formed in the same manner as the wings are formed on the pipe-section 2—that is, by hammering or upsetting the part of the reduced portion of the pipe-section which projects through the union member 8 after the union member has been placed in position on the reduced portion of the pipe-section. A nut 11, which is interiorly screw-threaded at 12 and which has an inwardly-extending flange 13, fits upon the union member 8 and screws on the union member 5, the flange 13 of the nut bearing against the flange 9 of the union member 8.

A washer 14, which is preferably formed of hard metal, such as iron or steel, is arranged between the ends of the pipe-sections 1 2, and when the nut 11 is screwed up tightly the washer 14 is held between the wings 4 4 of the two pipe-sections and forms a tight solid joint at that point.

The wings 4 4 on the ends of the pipe-sections 1 2 are produced by slitting the part of the reduced portion of the pipe-sections which protrude through the union members after the latter have been placed in position on the pipe-sections and then hammering or otherwise bending or upsetting the wings to the position shown in Fig. 2 of the drawings, the outer edge of the wings being rounded off to conform to the circular contour of the inner wall of the nut 11.

The union constructed as above described affords a cheap, convenient, and effective means of joining together the adjacent sections of soft-metal pipe, and the pipe-sections can be separated and joined together again as often as may be necessary without difficulty or without defacement of or injury to the parts.

Having described my invention, I claim—

1. In a device of the character described, the combination of a threaded nut having an inwardly-extending flange, a union member exteriorly screw-threaded and formed with recesses in its end, a union member formed with an annular flange adapted to engage the flange of said nut and having recesses in its end, a washer fitting between said union members and adapted to be interposed between the adjacent ends of pipe-sections projecting through said union member.

2. In a device of the character described, the combination with adjacent pipe-sections having reduced portions and radial wings, of union members fitting on said reduced portions and having recesses in their ends, said wings having projections which fit in said recesses, a nut having an inwardly-projecting flange, said nut fitting over one of said union members and screwing on the other of said union members, and a washer interposed between the adjacent ends of the pipe-sections, substantially as described.

In testimony whereof I affix my signature in the presence of two witnesses.

WILLIAM S. KEMPER.

Witnesses:
H. C. EVERT,
W. T. SNYDER.